(12) United States Patent
Weihrauch

(10) Patent No.: US 7,247,965 B2
(45) Date of Patent: Jul. 24, 2007

(54) ROTOR FOR AN ELECTRIC MOTOR

(75) Inventor: Niels Christian Weihrauch, Flensburg (DE)

(73) Assignee: Danfoss Compressors GmbH, Flensburg (DE)

( * ) Notice: Subject to any disclaimer, the term of this patent is extended or adjusted under 35 U.S.C. 154(b) by 2 days.

(21) Appl. No.: 10/539,500

(22) PCT Filed: Dec. 12, 2003

(86) PCT No.: PCT/DK03/00862

§ 371 (c)(1),
(2), (4) Date: Jun. 17, 2005

(87) PCT Pub. No.: WO2004/057727

PCT Pub. Date: Jul. 8, 2004

(65) Prior Publication Data

US 2006/0145557 A1    Jul. 6, 2006

(30) Foreign Application Priority Data

Dec. 19, 2002   (DE) ................................ 102 61 763

(51) Int. Cl.
*H02K 21/46* (2006.01)
*H02K 17/26* (2006.01)
*H02K 1/22* (2006.01)

(52) U.S. Cl. .................................. 310/156.78; 310/211
(58) Field of Classification Search ................. 310/211, 310/156.78–156.84
See application file for complete search history.

(56) References Cited

U.S. PATENT DOCUMENTS

| | | | |
|---|---|---|---|
| 3,113,230 A | 12/1963 | Linkous | 310/162 |
| 4,358,696 A | 11/1982 | Liu et al. | 310/156 |
| 5,182,483 A * | 1/1993 | Hibino et al. | 310/211 |
| 5,498,918 A | 3/1996 | Weihrauch | 310/261 |
| 6,223,416 B1 | 5/2001 | Boyd, Jr. et al. | 29/596 |
| 6,727,624 B2 * | 4/2004 | Morita et al. | 310/156.78 |

FOREIGN PATENT DOCUMENTS

| | | |
|---|---|---|
| CH | 458 510 | 8/1968 |
| DE | 740 689 | 5/1943 |
| GB | 1 177 247 | 1/1970 |
| JP | 56-71442 * | 6/1981 |
| WO | WO 97/45942 | 12/1997 |
| WO | WO 01/06624 A1 | 1/2001 |

OTHER PUBLICATIONS

Translation of JP 56-71442, "Electric Motor", T.Nakada, Jun. 15, 1981.*

* cited by examiner

*Primary Examiner*—Burton Mullins
(74) *Attorney, Agent, or Firm*—McCormick, Paulding & Huber LLP

(57) ABSTRACT

The invention relates to a rotor for an electric motor, especially an electric line-start motor, comprising spaces (4 to 7) which receive permanent magnets (10 to 13) and extend in an axial direction, and spaces (20 to 25) that accommodate conductor rods and extend in an axial direction. In order for the rotor to run as regularly as possible, the spaces (20 to 25) accommodating the conductor rods are provided with a substantially elongate cross-section in at least one sector of the rotor while being embodied in a curved manner along the longitudinal axis thereof in said sector when viewed from a cross-sectional perspective.

18 Claims, 2 Drawing Sheets

ROTOR FOR AN ELECTRIC MOTOR

CROSS REFERENCE TO RELATED APPLICATIONS

This application is entitled to the benefit of and incorporates by reference essential subject matter disclosed in international Patent Application No. PCT/DK2003/000862 filed on Dec. 12, 2003 and German Patent Application No. 102 61 763.5 filed on Dec. 19, 2002.

FIELD OF THE INVENTION

The invention concerns a rotor for an electric motor, particularly an electric line-start motor.

BACKGROUND OF THE INVENTION

The term electric line-start motor is used for hybrid a.c. motors, which represent a combination of an a.c. asynchronous motor with an a.c. synchronous motor. Such an electric line-start motor comprises a stator with several stator windings. The stator windings generate a rotating field, which generates a voltage in a rotor, which causes the rotor to rotate. The rotor of an electric line-start motor comprises features of both the rotor of an a.c. asynchronous motor and of the rotor of an a.c. synchronous motor. Line-start motors can also be dimensioned for one-phase mains supply, if required using an operating capacitor.

In the rotor of an a.c. asynchronous motor, which can also be called induction motor, conductor rods, for example of aluminium or copper, are located substantially in the axial direction. At the front sides of the rotor, the conductor rods can be connected by short-circuit rings. Together with the short-circuit rings, the conductor rods form the rotor winding and can have the shape of a cage, which is the reason why such a rotor is also called a squirrel cage rotor. During operation, the rotating field of the stator winding causes a current change in the conductor loops of the initially still standing rotor. The current change speed is proportional to the rotational speed of the rotating field. The induced voltage permits current to flow into the rotor conductor rods connected by short-circuit rings. The magnetic field generated by the rotor current causes a torque, which drives the rotor in the rotation direction of the stator rotating field. When the rotor would reach the rotational speed of the stator rotating field, the current change in the conductor loop concerned, and thus also the torque causing the rotation, would be zero. Therefore, in a.c. asynchronous motors, the rotor speed is always smaller than the rotating field speed. Thus, the speed of the rotor is not mechanically synchronous with the rotating field speed.

In the rotor of an a.c. synchronous motor, for example, permanent magnets can be located, which generate a magnetic rotor rotational field during operation. When the stator winding is provided with alternating current, the poles of the rotor are attracted by the counter-poles of the stator rotating field and shortly after repulsed by its uniform poles. Due to its mass inertia, the rotor cannot immediately follow the stator speed. When, however, the rotor has almost reached the speed of the stator rotating field, the rotor is, in a manner of speaking, pulled into the stator rotating field speed and runs on at that speed. This means that after the start of the rotor, the rotor runs synchronously with the stator rotating field speed.

The rotor of an electric line-start motor comprises both permanent magnets and conductor rods. The conductor rods form a starting aid for the rotor. When the speed of the stator rotating field has almost been reached, the permanent magnets evolve their effect. Thus, the electric line-start motor combines the good starting properties of an asynchronous motor, that is, large starting torque, with the high efficiency of the synchronous motor. When starting the motor, the conductor rods evolve their effect, whereas actually the permanent magnets only have an interfering effect during the start of the motor. In synchronous operation, however, for example at 50 Hz or 3000 rpm, the permanent magnets evolve their effect, whereas the conductor rods no longer contribute to the generation of the torque, as no voltage is induced into the conductor rods during synchronous operation.

The magnetic field existing in an air gap between the rotor and the stator during operation of the electric line-start motor comprises two components. The first component of the resulting field is caused by the stator windings. This is also called rotating field. The second component of the resulting field is caused by the permanent magnets. During operation of traditional electric line-start motors, as known from, for example, WO 01/06624 A1, torque fluctuations may occur, which are not desired.

SUMMARY OF THE INVENTION

One object of the invention is to provide a rotor particularly for an electric motor which makes the magnetic field approximately sine-shaped during synchronous operation.

It is desired that during synchronous operation the field strength of the magnetic field existing between the rotor and the stator is approximately sine-shaped. This, however, is counteracted by the permanent magnets in the rotor, which cause an angular course with traditional electric line-start motors. The desired sine-shaped rotating field is distorted by the traditional permanent magnets, thus contributing, during the synchronous operation, to torque fluctuations or torque pulsations, respectively. This undesired distortion during synchronous operation is generated in that the field strength of the permanent magnet is distributed in an unweakened manner over the rotor surface. In the direction of the magnet axis, the permanent magnets mainly determine the field. With traditional electric line-start motors, the rotor is thus only partly completely conductive for the magnet field of the stator in the direction of the neutral axis, not, however, in the direction of the magnet axis.

The rotor according to the invention is preferably a rotor for an electric motor, particularly an electric line-start motor with axially extending receiving spaces for permanent magnets and with axially extending accommodating spaces for conductor rods. At least in a sector of the rotor, the accommodating spaces for the conductor rods have a substantially elongate cross-section. When regarded in the cross-section, the accommodating spaces for the conductor rods in this sector are curved along their longitudinal axis. During investigations made in connection with the present invention, it has turned out that the torque fluctuations occurring with traditional electric line-start motors are caused by the fact that the course of the field strength of the resulting magnetic field in the air gap between stator and rotor over the rotation angle is not sine-shaped but, at least partly, angular. With the embodiment and the location of the accommodating spaces for the conductor rods according to the invention, an approximately sine-shaped course can be achieved during operation.

A preferred embodiment example of the rotor is characterised in that several permanent magnets, particularly four permanent magnets, are located so that they generate a rotating magnet field with a neutral axis and a magnet axis, which is arranged to be perpendicular to the neutral axis. The curvature radii of the accommodating spaces for the conductor rods decrease from the neutral axis in the direction of the magnet axis, which means that the curvature radii are smaller close to the magnet axis than close to the neutral axis. The neutral axis extends, where the permanent magnets generate no magnet field. The magnet axis extends, where the magnet field generated by the permanent magnets is strongest. The field strength of the permanent magnet field can, for example, amount to 1.5 Tesla. The magnet field generated by the stator windings runs from the stator through the rotor and back into the stator. The reduction of the curvature radii from the neutral axis towards the magnet axis causes that the magnet field lines occurring from the stator during the start can penetrate the rotor in a good manner.

A further preferred embodiment example of the rotor is characterised in that the distance between the accommodating spaces for the conductor rods is constant. During tests made within the frames of the present invention, this embodiment has proved to be particularly advantageous.

A further preferred embodiment example of the rotor is characterised in that in a cross-sectional view the accommodating spaces for the conductor rods are curved and arranged along their longitudinal axis in such a manner that the distance of the accommodating spaces for the conductor rods to the rotational axis of the rotor, in a cross-sectional view through the rotor, increases from the neutral axis in the direction of the magnet axis. This creates free spaces, in which the field lines of the magnet fields generated by the stator windings can penetrate the rotor.

A further preferred embodiment example of the rotor is characterised in that in a cross-sectional view through the rotor and disregarding the curvature of the accommodating spaces, the longitudinal axes of the accommodating spaces for the conductor rods are aligned substantially radially in relation to the rotor, and in that in a cross-sectional view through the rotor the longitudinal axes of the accommodating spaces of the conductor rods are arranged to be turned in relation to the magnet axis in such a manner that in a cross-sectional view through the rotor the radial outer ends of the accommodating spaces for the conductor rods are located at a smaller distance to the magnet axis than with a radial alignment. This means that in the vicinity of the magnet axis of the permanent magnets the longitudinal axes of the accommodating spaces for the conductor rods extend substantially in parallel to said magnet axis. This again causes that, also in the vicinity of the magnet axis; the magnet field generated by the permanent magnets can penetrate in an unhindered manner between the accommodating spaces for the conductor rods.

A further preferred embodiment example of the rotor is characterised in that in a cross-sectional view each accommodating space for the conductor rods has two side walls, which have different curvatures. Thus, the accommodating spaces for the conductor rods have a substantially sickle-shaped design.

A further preferred embodiment example of the rotor is characterised in that the curvature radii of the side walls of the accommodating spaces for the conductor rods are reduced from the neutral axis towards the magnet axis. The smaller the curvature radius of the side walls is, the smaller is the length of the accommodating space enclosed by the side walls. During tests of the efficiency of the electric motor within the frames of the present invention, this has turned out to be advantageous.

A further preferred embodiment example of the rotor is characterised in that in a cross-sectional view through the rotor, the inwardly turned ends of the side walls of the accommodating spaces for the conductor rods are connected by a rounded connecting wall. This has turned out to be particularly advantageous from manufacturing-technical and functional points of view.

A further preferred embodiment example of the rotor is characterised in that the connecting walls of all accommodating spaces for the conductor rods have the same radius. This causes that radially inside the distance between the side walls is also constant.

A further preferred embodiment example of the rotor is characterised in that the receiving spaces for the permanent magnets are curved and arranged around the rotational axis of the rotor in such a manner that in a cross-sectional view through the rotor the distance between the receiving spaces for the permanent magnets and the accommodating spaces for the conductor rods is larger in the area of the magnet axis than in the area of the neutral axis. This ensures sufficient space for the magnetic field lines of the magnet field generated by the stator.

A further preferred embodiment example of the rotor is characterised in that in a cross-sectional view through the rotor the receiving spaces for the permanent magnets have the shape of bows, which are arranged in the shape of an ellipse, whose main axis covers the neutral axis and whose auxiliary axis covers the magnet axis. During operation of the device according to the invention, this has turned out to be particularly advantageous with regard to the distribution of the magnet field lines.

A further preferred embodiment example of the rotor is characterised in that the rotor has at least one transition zone, in which the accommodating spaces for the conductor rods are not curved. The rotor can have the shape of a rotor lamination mounted on a shaft. In the transition zone laminated sheets may be arranged, which have no curved accommodating spaces for the conductor rods. The transition zone helps achieving a so-called helical groove, meaning that a conductor rod at a first end of the rotor is offset in relation to the conductor rod at the other end of the rotor. This offsetting, for example between 10 and 20 mechanical degrees, is achieved in the transition zone, as the conductor rod does not run in parallel with the rotational axis of the rotor, but laterally inclined. The helical groove causes a desired, substantial reduction of the amplitude of the magnetic harmonics interfering in the rotary field. The transition zone comprises, for example, 10 to 20 sheets, whose receiving spaces are offset in relation to each other.

A further preferred embodiment example of the rotor is characterised in that the accommodating spaces for the conductor rods are closed on the radial outside. Preferably, the accommodating spaces for the conductor rods are located on the outer circumference of the rotor, and even though they have closed cross-sections, they can also be called grooves. The fact that the accommodating spaces are closed causes that the high-frequency shares in the magnet field induce no loss currents in the conductor rods.

With an electric motor, particularly an electrical line-start motor, with a stator comprising a plurality of windings, the task mentioned above is solved in that a previously described rotor is arranged to be rotational inside the stator. By means of the rotor according to the invention, the magnet field during the start of the electric motor can be controlled so that gaps in the magnet field of the permanent magnets can be filled. With the approximately sine-shaped course of the magnet field or the magnet field strength or the magnetic current intensity, respectively, efficiencies of more than 90% can be achieved.

A preferred embodiment example of the electric motor is characterised in that short-circuit rings are arranged on the front sides of the rotor, said short-circuit rings connecting the conductor rods with each other. The short-circuit rings and the conductor rods form a cage, into which a voltage is induced.

BRIEF DESCRIPTION OF THE DRAWINGS

Further advantages, features and details of the invention occur from the following description, in which an embodiment example is described in detail with reference to the drawings, showing.

DETAILED DESCRIPTION OF THE PREFERRED EMBODIMENTS

Figure 1:
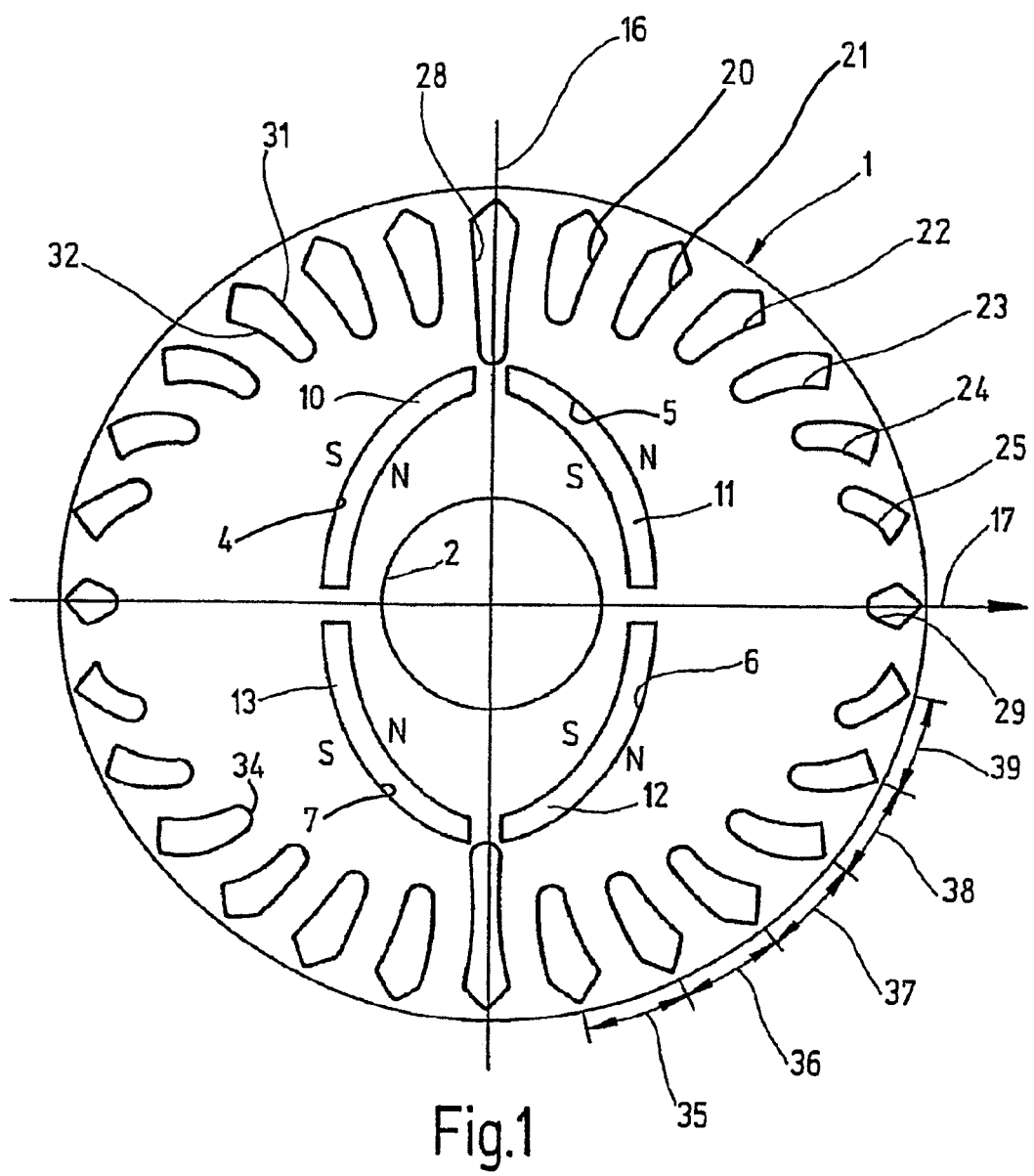
FIG. 1 is a view of a cross-section through the rotor.

FIG. 1 shows a cross-section of a rotor 1 of an electric line-start motor. The rotor 1 has a central through-hole 2 serving the adoption of a shaft (not shown), via which the torque generated by the electric motor can be supplied.

Four receiving spaces 4, 5, 6, 7 for permanent magnets 10, 11, 12, 13 are located around the through hole 2. The receiving spaces 4 to 7 extend in the axial direction, at least over a part of the length of rotor 1. In a cross-sectional view, the four receiving spaces 4 to 7 for the permanent magnets 10 to 13 are arranged in the form of an ellipse. The poles of the permanent magnets are marked by means of the capital letters N for North Pole and S for South Pole. The arrangement of the permanent magnets shown leads to the formation of a magnet field, whose field strength is zero along a neutral axis 16 and largest along a magnet axis 17.

Towards the outside, the rotor 1 is bordered by a circular cylinder shield, whose circumference accommodates a plurality of accommodating spaces 20 to 25 and 28, 29 for conductor rods. The accommodating spaces for conductor rods (not shown) extend in the axial direction over the whole length of the rotor 1. In relation to the neutral axis 16 and the magnet axis 17, the rotor 1 in itself is made to be symmetrical. Thus, for reasons of clarity, only the accommodating spaces 20 to 25 and 28, 29 for the conductor rods are provided with reference numbers.

Each accommodating space for a conductor rod, which could also be called an accommodating space for a conductor winding, comprises two side walls 31 and 32, which are connected by a semicircle-shaped connecting wall 34. At the outer end, the longitudinal accommodating spaces for the conductor rods are made to be pointed or obtuse in a tapered manner. The distances 35 to 39 between the outwardly facing ends of the accommodating spaces for the conductor rods are constant.

FIG. 1 shows that the two side walls of the accommodating space 28 are made to be concave. As opposed to this, the two side walls of the accommodating space 29 are made to be convex. The accommodating space 28 is divided into two identical halves by the neutral axis 16 and the accommodating space 29 is divided into two identical halves by the magnet axis 17. Each of the accommodating spaces 20 to 25, located between the accommodating spaces 28 and 29 and thus between the neutral axis 16 and the magnet axis 17, has a convex and a concave side wall. The curve radius of the accommodating spaces 20 to 25 decreases from the neutral axis 16 in the direction of the magnet axis 17. This means that the accommodating space 20 has the largest curve radii and the accommodating space 25 has the smallest curve radii.

Figure 2:
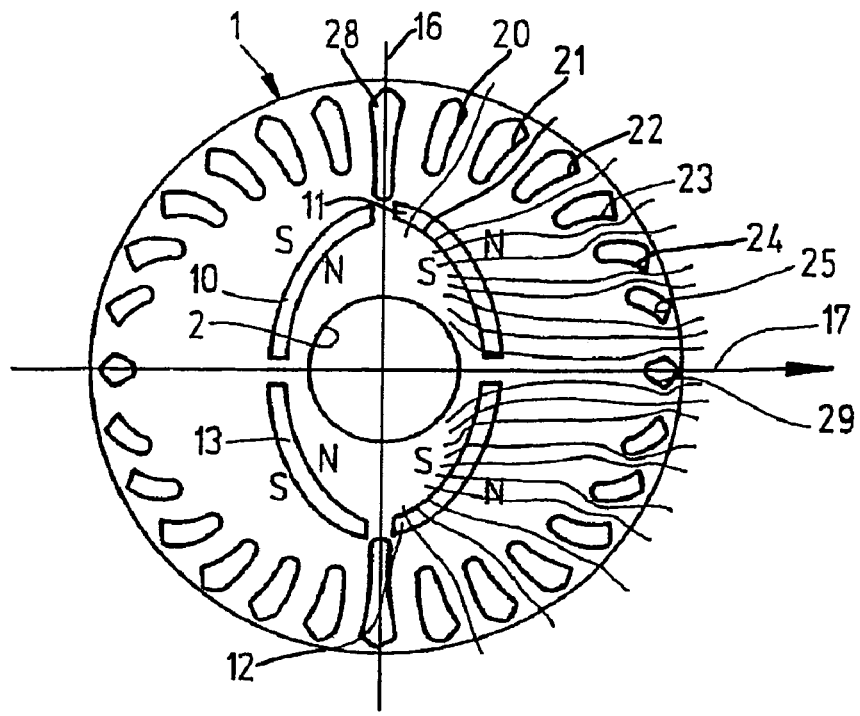
FIG. 2 is a scaled down view of the rotor in FIG. 1 with field lines of the magnet field generated by the permanent magnets.

FIG. 2 partly shows the magnet field generated by the permanent magnets 10 to 13 in the form of magnet field lines.

Figure 3:
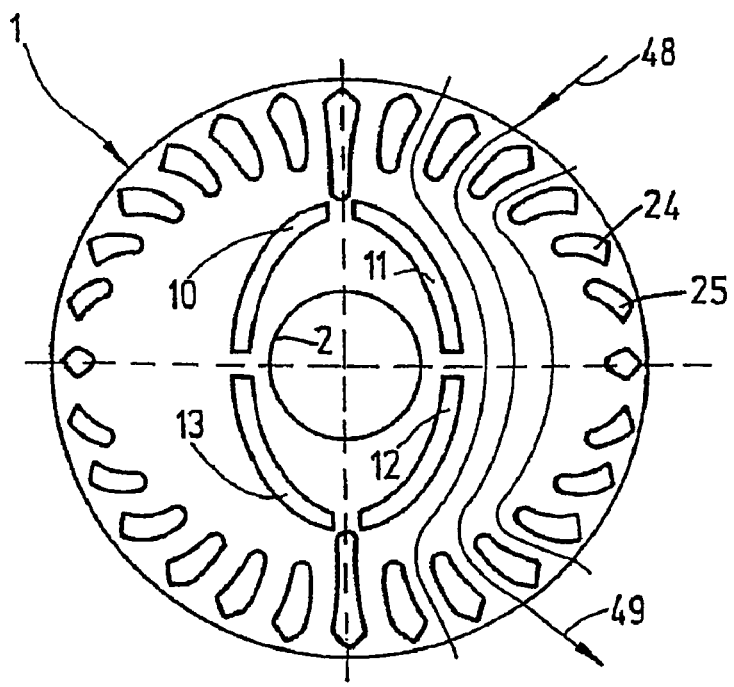
FIG. 3 is the rotor in FIG. 2 with field lines of the magnet field generated by a stator.

FIG. 3 partly shows the magnet field generated by a stator (not shown) during the asynchronous start of the rotor in the form of magnet field lines. The arrows 48 and 49 in FIG. 3 show the magnetic current through the rotor 1.

The curved accommodating spaces for the conductor rods, which can also be called grooves, involve the advantage that the magnet field generated during operation of the electric line-start motor (not shown) is led through the rotor 1 in a controlled manner. Thus, during operation of the electric motor, an approximately sine-shaped course of the field strength of the resulting magnet field can be generated in the air gap between stator and rotor.

During synchronous operation of the electric motor the primary function of the curve of the grooves or accommodating spaces, respectively, for the conductor rods is to distribute the magnet field generated by the permanent magnets in a sine-shaped manner in the air gap between rotor and stator. Accordingly, the magnet field is weakest in the area of the neutral axis and strongest in the area of the magnet axis.

Further, during the start of the electric motor, the curved design of the accommodating spaces for the conductor rods and the special location of the conductor rods provide much space for the magnet field of the stator penetrating the rotor. As shown in FIG. 3, sufficient space for the penetration of the magnet field lines is available between the accommodating spaces 24 and 25 for the conductor rods and the permanent magnets 11. Thus, magnetic bottlenecks are avoided, which could cause an undesired saturation of the rotor sheet. The special location of the permanent magnets further increases the available space.

By means of the invention it is achieved that during the start of the electric motor the magnet field is controlled so that gaps in the magnet field, which are caused by the permanent magnets, are filled.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A rotor for an electric motor with axially extending receiving spaces for permanent magnets and with axially extending accommodating spaces for conductor rods, wherein in at least one sector of the rotor the accommodating spaces for the conductor rods have a substantially elongate cross-section, and that in the at least one sector, in a cross-sectional view, the accommodating spaces for the conductor rods are made to be curved along their longitudinal axis; and wherein in the at least one sector each accommodating space for conductor rods has two sidewalls, and, in a cross-sectional view, the two sidewalls of each accommodating space for conductor rods are curved in a similar direction.

2. The rotor according to claim 1, wherein the distance between the accommodating spaces for the conductor rods in the at least one sector is constant.

3. The rotor according to claim 1, wherein a plurality of permanent magnets are located so that they generate a rotating magnet field with a neutral axis and a magnet axis.

4. The rotor according to claim 3, wherein in a cross-sectional view the accommodating spaces for the conductor rods in the at least one sector are curved and arranged along their longitudinal axis in such a manner that the distance from the accommodating spaces for the conductor rods to the rotational axis of the rotor, in a cross-sectional view through the rotor, increases from the neutral axis in the direction of the magnet axis.

5. The rotor according to claim 3, wherein in a cross-sectional view through the rotor, the curvature of the accommodating spaces for conductor rods in the at least one sector is such that a radial outer end of each accommodating space for conductor rods is turned toward the magnet axis, so as to be closer to the magnet axis than if the accommodating spaces for conductor rods were not curved along their longitudinal axis.

6. The rotor according to claim 3, wherein the receiving spaces for the permanent magnets are curved and arranged around the rotational axis of the rotor in such a manner that in a cross-sectional view through the rotor the distance between the receiving spaces for the permanent magnets and the accommodating spaces for the conductor rods is larger in the area of the magnet axis than in the area of the neutral axis.

7. The rotor according to claim 6, wherein in a cross-sectional view through the rotor the receiving spaces for the permanent magnets have the shape of bows, which are arranged in the shape of an ellipse, whose main axis covers the neutral axis and whose auxiliary axis covers the magnet axis.

8. The rotor according to claim 1, wherein the rotor has at least one transition zone, in which the accommodating spaces for the conductor rods are not curved.

9. The rotor according to claim 1, wherein the accommodating spaces for the conductor rods are closed on the radial outside.

10. An electric motor, particularly an electrical line-start motor, with a stator comprising a plurality of windings, wherein the rotor according to claim 1, is arranged to be rotational inside the stator.

11. The electric motor according to claim 10, wherein short-circuit rings are arranged on the front sides of the rotor, said short-circuit rings connecting the conductor rods with each other.

12. A rotor for an electric motor with axially extending receiving spaces for permanent magnets and with axially extending accommodating spaces for conductor rods, wherein in at least one sector of the rotor the accommodating spaces for the conductor rods have a substantially elongate cross-section, and that in the at least one sector, in a cross-sectional view, the accommodating spaces for the conductor rods are made to be curved along their longitudinal axis; and wherein a plurality of permanent magnets are located so that they generate a magnet field with a neutral axis and a magnet axis, the curvature radii of the accommodating spaces for the conductor rods in the at least one sector decreasing from the neutral axis in the direction of the magnet axis.

13. A rotor for an electric motor with axially extending receiving spaces for permanent magnets and with axially extending accommodating spaces for conductor rods, wherein in at least one sector of the rotor the accommodating spaces for the conductor rods have a substantially elongate cross-section, and that in the at least one sector, in a cross-sectional view, the accommodating spaces for the conductor rods are made to be curved along their longitudinal axis; and wherein in a cross-sectional view each accommodating space for the conductor rods in the at least one sector has two side walls, which have different curvatures.

14. The rotor according to claim 13, wherein a plurality of permanent magnets are located so that they generate a rotating magnet field with a neutral axis and a magnet axis, and wherein the curvature radii of the side walls of the accommodating spaces for the conductor rods in the at least one sector are reduced from the neutral axis towards the magnet axis.

15. The rotor according to claim 13, wherein in a cross-sectional view through the rotor, the inwardly turned ends of the side walls of the accommodating spaces for the conductor rods in the at least one sector are connected by a rounded connecting wall.

16. The rotor according to claim 15, wherein the connecting walls of all accommodating spaces for the conductor rods in the at least one sector have the same radius.

17. An electric motor comprising:

a stator comprising a plurality of windings; and a rotor with axially extending receiving spaces for permanent magnets and with axially extending accommodating spaces for conductor rods, wherein in at least one sector of the rotor the accommodating spaces for the conductor rods have a substantially elongate cross-section, and that in the at least one sector, in a cross-sectional view, the accommodating spaces for the conductor rods are made to be curved along their longitudinal axis; and wherein the rotor is arranged to be rotational inside the stator; and wherein in the at least one sector each accommodating space for conductor rods has two sidewalls, and, in a cross-sectional view, the two sidewalls of each accommodating space for conductor rods are curved in a similar direction.

18. The electric motor according to claim 17, wherein short-circuit rings are arranged on the front sides of the rotor, said short-circuit rings connecting the conductor rods with each other.

* * * * *